United States Patent [19]
Casazza

[11] 3,942,032
[45] Mar. 2, 1976

[54] POWER INJECTOR CONTROL MEANS FOR TRANSMISSION NETWORKS

[76] Inventor: John A. Casazza, 302 Passaic Ave., Hasbrouck Heights, N.J. 07604

[22] Filed: Feb. 15, 1974

[21] Appl. No.: 442,779

[52] U.S. Cl. ................................. 307/148; 307/3
[51] Int. Cl.² ......................................... H02J 3/00
[58] Field of Search .......... 235/151.21; 307/31, 32, 307/33, 34, 11, 20, 19, 148, 147, 12, 17, 19, 24, 44, 50, 51, 52, 69, 77, 87, 3; 323/114, 111, 112; 317/103

[56] References Cited
UNITED STATES PATENTS

| | | | |
|---|---|---|---|
| 1,639,473 | 8/1972 | Taylor | 307/147 |
| 1,745,870 | 2/1930 | Sparkes | 307/20 |
| 3,668,413 | 6/1972 | Ainsworth | 235/151.21 |
| 3,823,346 | 7/1974 | Olsen | 317/103 |

*Primary Examiner*—Robert K. Schaffer
*Assistant Examiner*—M. Ginsburg

[57] ABSTRACT

Means for better balancing and controlling of circuit loadings in electric power transmission networks to significantly reduce the number and/or cost of the transmission lines and facilities required to make a specific power transfer by significantly increasing the transmission capability of a given network by superimposing controlled circulating alternating currents for redistribution of power and current flows in the network.

15 Claims, 2 Drawing Figures

POWER INJECTOR CONTROL MEANS FOR TRANSMISSION NETWORKS

BACKGROUND

Present AC transmission lines, transformers, circuit breakers, and other devices, are connected in networks or grids. Such integrated networks, and their components, interconnect generating stations which supply electric power and substations which deliver electric power for distribution to consumers.

Presently these transmission facilities are used very ineffectively. Power transfers to or from one area or region to another are limited by loading conditions on a specific circuit(s) even though many other circuits having the capacity to deliver power are loaded below their ratings or capability. The resultant average loadings of transmission lines and equipment are significantly below their carrying capacities or ratings. In fact, studies show average loadings of about 30 percent of ratings on an annual basis and under 40 percent of ratings even during heavy loading periods. The improvement of the utilization of transmission facilities can produce benefits in two ways:

a. Make possible increased power transfers over facilities that have previously been installed.

b. Reduce the need for transmission system additions required to meet future needs.

The present poor utilization of transmission results from a number of factors:

a. The major reason under steady state conditions is that the division of loadings on transmission lines and facilities in AC networks is in accordance with Kirchoff's Laws holding that the impedances of various network branches determine the loadings of the various branches. This results in a division of loadings which is not in proportion to the capacities or ratings. Also, electric power flow patterns are continually changing in transmission networks because of consumption changes and because the transmission and generation facilities in operation change from time to time.

In a simple example, if two electric power transmission lines of differing capacity and/or impedance connect two areas in a system, the steady state power transfer limit between the two areas with all facilities available is reached when the first line becomes loaded to its carrying capacity or rating. Since the second line is not loaded to capacity under this condition, additional power can be transferred over the two lines through the injection of of controlled circulating current using the means described herein to reduce the loading of the first line and increase the loading of the second line so that both lines can be loaded to their ratings.

b. When a transmission line or generator becomes unavailable for service due to a sudden failure and automatic disconnection by action of relays and circuit breakers, power flows are automatically redistributed in the networks in accordance with Kirchoff's Laws resulting in a new division of power flows which, in most cases, does not result in the loading of transmission lines and facilities in accordance with ratings. The rapid injection of a controlled circulating current(s) in one or more circuits of the network by the means described herein will redistribute the power flows as described in (a) above so that larger total power transfers can be safely made.

c. The schedules for electric power production among the generating stations in the network so as to meet total electric power requirements are varied as total power usage varies so as to optimize total incremental costs for generation considering the availability and cost of fuel. Such changes in schedules cause changes in loadings on the transmission systems resulting in transmission facilities not being loaded in proportion to ratings thus reducing transmission capability from one area to another. The rapid injection of a controlled circulating current(s) by the means described herein located in an appropriate circuit(s) will redistribute the power flows so that larger total power transfers can be made.

d. Sudden transient disturbances resulting from short-circuits or other failures in the transmission system produce oscillations in the instantaneous speed of generators with respect to the rest of the network which can cause them to lose synchronism requiring that they be automatically disconnected from service. Extra transmission facilities are sometimes provided to reduce such oscillations. Such oscillations result from an imbalance between mechanical power input to the generators and their electrical power output. The very high-speed injection of properly controlled circulating currents using the means described herein will change the pattern of transmission circuit loadings in the vicinity of such a generator so as to dampen such oscillations thus increasing safe generator loading limits for a given transmission system or reducing transmission requirements for future generator installations.

Dynamic oscillations can occur between areas or regions when interconnected with AC transmission which considerably reduce that amount of electric power that can be transferred. When the two areas that are to be interconnected are previously isolated from each other the oscillations may be of sufficient magnitude as to prevent an AC transmission tie and require the installation of a higher cost DC transmission tie. By properly controlled use of the means described herein in the transmission circuits interconnecting the two areas these oscillations can be dampened so that transmission capability is increased and the need for high-cost DC transmission avoided.

e. AC transmission networks have circuit breakers installed at various points so that facilities on which short circuits occur are automatically disconnected. The circuit breakers, and associated bus equipment, must be able to withstand and interrupt the maximum short circuit current that may occur. As AC transmission networks grow and generating stations and substations are added, the magnitude of the short circuit currents can exceed the capability of the associated buses and circuit breakers to withstand and interrupt them, required a replacement of these circuit breakers and/or a physical replacement of the buses involved. By use of the means described herein, current may be injected at a sufficiently fast speed to reduce the resulting short circuit currents within the capability of the circuit breakers and buses, thus eliminating the need for expensive reinforcements and replacements.

By judiciously locating the device described herein in a circuit or number of circuits in the transmission network, a combination of the benefits described above can be obtained resulting in multiple benefits from each device.

In fact, to date a number of such methods exist for achieving some of the above improvements in the transmission of electrical power in AC networks. These have included:

1. Use of phase angle regulators or quadrature boosters. These are large, massive devices that are expensive. They have experienced frequent failures and cannot be changed in settings rapidly. However, such devices are being increasingly used in the U.S.A. and in other nations. They do not however have the ability to achieve the fast changes of the device described herein.

2. Use of DC transmission lines operating in parallel with the AC network. This, too, presents an expensive and complex solution. The DC lines require full capacity rectification and inversion equipment as well as a large amount of reactive correction capacity. The need to design the DC circuit and equipment for full circuit capacity, voltage, and insulation level results in higher costs compared to achieving the same results with an AC circuit equipped with the device described herein. Also, the reliability of such DC circuits to date has been lower than the reliability which has been achieved with AC circuits of similar capacity.

3. Use of operating personnel directly or through supervisory controls to adjust generation schedules at the generating stations or the electrical arrangement of a transmission network by closing or opening circuit breakers when this can improve the utilization of facilities under specific loading conditions. Such changes are usually achieved at a penalty in fuel costs and fuel consumption required to meet overall system energy requirements. Use of the device described herein will not require such fuel penalties.

SUMMARY OF THE INVENTION

It is, with the recognition of the foregoing background, the object of this invention to provide a control means for AC transmission networks that will improve not only the effective use of transmission lines and facilities in integrated networks but do it for a lesser cost than any method presently available using a means that is readily adaptable to existing networks and future additions thereto. In fact, this invention demonstrably provides a unique and low cost method for controlling the steady state and transient loadings of AC transmission circuits and equipment which is applicable in integrated AC networks and for AC lines connecting isolated AC networks.

The objective is to increase the usefulness of transmission facilities and reduce the need for future facility additions in integrated AC networks or grids.

A further object of this invention is to provide a unique means for control of an energy system having a fast response provided by electrical means operable automatically. The fast response is achieved since the moving of large physical masses, as with phase angle regulators, will not be required.

Still another object of this invention is to provide such a means which if inoperative will not remove from the AC transmission system an important transmission line for an extended period of time.

In summary, the unique means provided by the power injector system of this invention can significantly reduce the additions and investments needed in AC transmission networks or grids. It can and does provide the AC transmission systems existing throughout the U.S.A. and the world with the controllability of DC transmission at a fraction of the cost. Furthermore, the fast response characteristic of this invention can be utilized to help improve stability conditions and provide the needed control when connecting isolated AC systems. The power injection system of this invention also can function to limit short-circuit duties; and, because it can be installed on an insulated platform or base, the power injection system can have a significantly reduced insulation level compared to insulation levels needed by conventional DC applications aforedescribed providing substantial cost savings.

DRAWING DESCRIPTION

FIG. 1 is a schematic simplified illustration of an AC transmission network or grid to which this invention is applicable; and FIG. 2 is a one-line diagram (one phase of a three-phase system) of the transmission grid or network of FIG. 1 with a power injection system according to this invention connected thereto.

DETAILED DESCRIPTION

Figure 1:
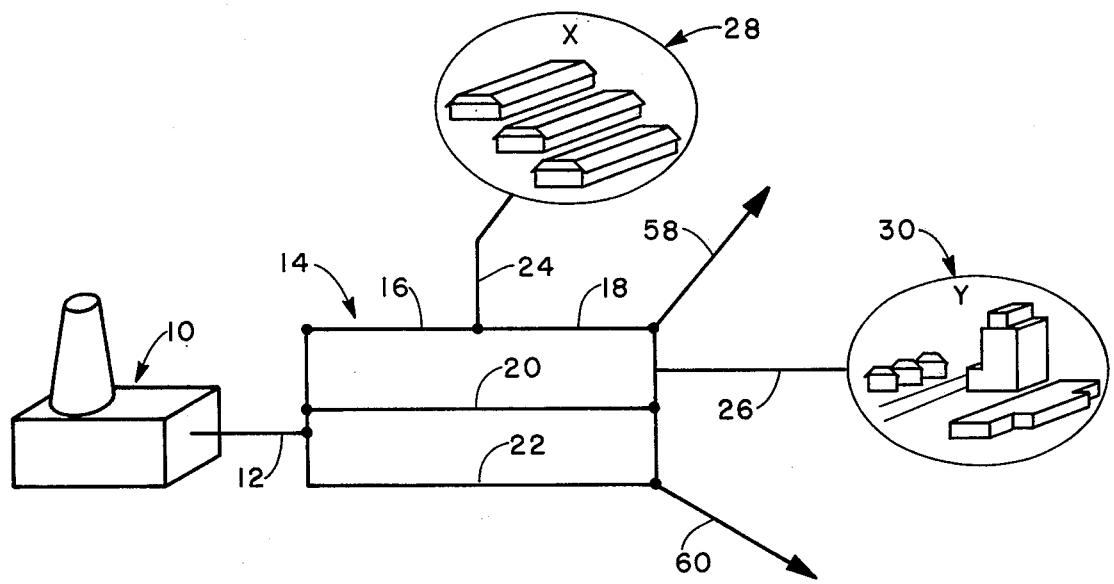

With particular reference to FIG. 1 there is shown in one-line diagram form electrical generating station 10 generating three-phase alternating current connected by a step-up transformer station 12 to a transmission network 14 comprising lines 16, 18, 20, and 22. The transmission network or grid 14 is connected to substations 24 and 26 to supply the electrical requirements of areas 28 and 30, respectively, being, for example, industrial complex X and town Y. This network 14 might be connected to other networks by transmission lines 58 and 60. These load stations 24 and 26 could require, for example, 500 MW and 1000 MW, respectively, that in turn is provided by the generation of 1500 MW at generating station 10. By reason of Kirchoff's Laws, this power could be normally divided in this sample network such that line 16 carries 700 MW to deliver 500 MW to station 28 and 200 MW for line 18 with lines 20 and 22 having normally 400 MW transmitted equally thereby that combines with the 200 MW of line 18 to provide 1000 MW to substation 26 and with lines 58 and 60 normally not delivering or receiving any power. If, for example, these transmission lines are rated normally for 600 MVA and in emergencies for 800 MVA a loading in excess of normal capacity would exist on line 16 and a loading below normal capacity would exist on lines 20 and 22. Also, if line 22, for example, trips out of service then line 16 could be carrying 900 MW and line 20 600 MW because of Kirchoff's Laws, resulting in a loading in excess of emergency capacity on line 16 while line 20 would be loaded less than emergency capacity.

Figure 2:
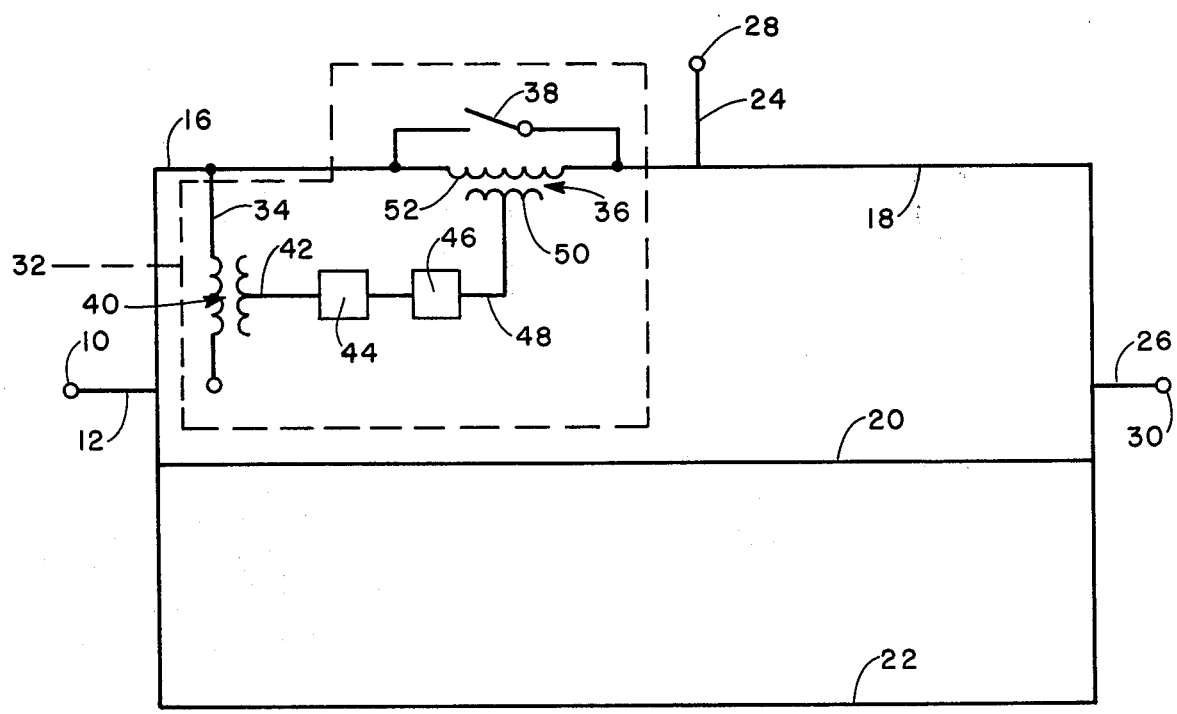

Now with reference to FIG. 2 a power injection system 32 is connected to line 16. This system will inject a small amount of power by means of introducing in each phase controlled voltages having quadrature components in relation to the line phase to ground voltages of the same frequency which will cause circulating currents to flow to balance the loadings on the circuits. In the simple example referred to above, and in FIG. 1, the voltage and power injected in line 16 would be controlled in the normal transmission network arrangement to circulate 200 MW to reduce the loading on line 16 by 200 MW to 500 MW and increase the loading on lines 20 and 22 by 100 MW each to 500 MW so that all circuits are within their normal ratings. Also, in the simple example described above and in FIG. 2, the voltage and power injected in line 16 would be rapidly changed if line 22 trips out of service to circulate 150 MW to reduce the loading on line 16 to 750 MW and increase the loading on line 20 to 750 MW so that the two remaining circuits would be loaded within their emergency ratings.

The voltage injected into line 16 could be varied rapidly and continuously as required by changing system conditions and by the availability of transmission facilities. The amount of power required to be injected would be equal to the net change in losses created in the network, and in some cases this could even be negative. While the injection of predominantly quadrature voltages are required for control of real power flows (MW), in-phase voltage components can also be injected when required to control voltages and reactive power flows (Mvar) or short circuit duties.

The power injection device 32 consists of the following major components:

A suppply transformer(s) 40.

AC to DC rectification equipment, including suitable reactive compensation and filtering and smoothing equipment as necessary 44.

DC to AC inversion equipment including suitable reactive and harmonic compensation as necessary 46.

A power injector transformer 36.

Suitable controls based on present practice.

A high-speed by-pass switch 38 may be provided on the injection transformer.

Connections between the above components having adequate insulation for the voltages used and adequate capacity for the currents involved, 34, 42, 48.

The supply transformer 40 is shown connected 34 to line 16 but may alternatively be supplied by any other convenient and adequate AC source available. A three-phase to three-phase transformation, or a three-phase to six-phase transformation, or a three-phase to 12-phase transformation may be used; and the supply transformation may be provided in a single piece of equipment or in physically separate transformers; and transformer voltage ratios may be changed by use of no-load taps or taps which may be changed under load. All of the above characteristics are details of design that will depend on the specific application and involve only the use of conventionally available equipment readily understood by those skilled in the art and do not, therefore, require detailed description.

The output from the supply transformer flows via lead 42 to a power rectification system 44 to provide controlled DC source that is filtered and smoothed. The output of the rectifier flows directly to the invertor 46 which provides a controlled AC output with acceptable harmonic content by connector 48 to the primary winding 50 of power injector transformer 36. The rectification and inversion equipment, including associated controls, aforedescribed are conventional devices readily understood by those skilled in the art and do not, therefore, require detailed description.

As can be seen in FIG. 2 the secondary windings 52 of the power injector transformer are connected in series in the line 16 whose power flow is to be controlled. The secondary winding 52 current rating required is the maximum current expected to be carried by the line 16, whereas the secondary winding 52 voltage rating required will be a small fraction of the phase-to-ground voltage of the line 16 being regulated.

Depending on the specific application, the power injector transformer 36 may provide a three-phase to three-phase transformation, or a six-phase to three-phase transformation, or a 12-phase to three-phase transformation, using one or several separate pieces of equipment, having no-load or load tap changing equipment, and involves only the use of conventionally available equipment readily understood by those skilled in the art and does not, therefore, require a detailed description.

The key element in this invention is the use of a rectification to DC and an inversion back to AC in order to obtain an AC voltage source rapidly controllable in magnitude and phase angle for the creation of circulating currents in AC networks to obtain the benefits described heretofore. The DC voltage used is optimized to minimize overall power injection system costs for each type of application, as may be realized from solid-state and other technology for the equipment. Low overall system costs are possible to a large extent because the overall MVA rating of the power injection system of this invention will be a small fraction of the power carrying capability of the transmission line or equipment whose loading is being regulated. This attribute also enables the accomplishment of the installation of the system on an insulated platform or base as mentioned above in the objects of the invention.

The control of the power injection voltage and current will be accomplished through control of the timing of the firing angles in the rectifier system 44 and invertor 46. Variation of quadrature voltage injected will control real power flows, and variation of in-phase voltage will control reactive flow and short-circuit currents.

The high-speed by-pass 38, will be provided when required by the specific application and will be operable automatically or manually, as will be understood by those skilled in the art, to leave the line 16 available to continue limited operation during outages of the power injection system 32.

Having set forth the objects, advantages, and embodiments which this invention has thus far been visualized to have and comprise, the protection sought by these Letters Patent is seen by reference to the appended claims:

What is claimed is:

1. In an AC transmission network for supplying power, a power injection system for controlling current and power flow in separate portions of the network, said power injection system comprising:

a source of AC power;

a means to provide a DC source from said source of AC power;

a means to provide a rapidly controlled AC source from said DC source; and a means to employ said controlled AC source at the most advantageous locations in the network to control the magnitude and distribution of AC current and power.

2. The structure of claim 1 and further characterized by comprising supply transformer tapping AC from the portion of the network, to provide the AC supply.

3. The structure of claim 2 and further characterized by said means to provide a DC source being a rectifier system including reactive compensation and a filtering and smoothing means.

4. The structure of claim 3 wherein said means to provide a rapidly controlled AC source is an invertor including reactive and harmonic compensation.

5. The structure of claim 4 wherein said means to employ said controlled AC source is a power injector transformer having its primary winding connected to said invertor and its secondary winding in series connection with a portion of the network.

6. The structure of claim 1 having means in the portion of the network to by-pass the power injection system whereby it may be removed from affecting the transmission network.

7. An AC electrical grid comprising:
a power generating system;
means connected to said power generating system to distribute AC power to a transmission network;
at least one load station for using the power from said transmission network; and
injection means in series connection with said transmission network, said means comprising a power injector transformer in at least one line controlling the current and power flow in that line and thereby controlling power flows in other lines of said transmission network.

8. An AC electrical grid according to claim 7 wherein said injection means is operative by AC in one or more lines to provide a DC signal inverted to an AC signal to, by said power injector transformer, provide a quadrature voltage for controlling real power flow in the line, and also provide an in-phase voltage that is variable to control reactive flow and shortcircuit currents.

9. An AC electrical grid according to claim 7 wherein said injection means is operative by any source of electrical power to vary quadrature voltage for control of real power flow and in-phase voltage to control reactive flow and short-circuit currents in said network.

10. The structure of claim 7 and further including means to by-pass the injector means control of the network.

11. A means to control AC transmission lines of a network comprising:
a power injector transformer in series connection in a line; and
a means to provide a controlled AC source controllable in magnitude and phase angle to said power injector transformer to control real power flow, reactive flow, and short-circuit currents in lines of said network, said means operable by a power rating of a small fraction of that flowing in the line.

12. The structure of claim 11 and further characterized in that said power injection transformer includes a secondary winding in series connection with said line having a current rating equivalent to said line and a voltage rating that is a fraction of the voltage of the line being regulated.

13. The structure of claim 12 wherein said means includes a supply transformer providing an AC source with rectifying, filtering, and smoothing means providing a DC source from the AC supply transformer and an invertor means receiving said DC source to provide a rapidly controlled AC source to the primary winding of said power injector transformer.

14. The structure of claim 13 and further comprising a high-speed by-pass in said line about the series connection of said secondary winding with the line.

15. The structure of claim 13 wherein the rectifying means and the invertor are controllable valves for control of the voltage and power to the primary winding.

* * * * *